United States Patent
Hamon et al.

(10) Patent No.: US 10,749,158 B2
(45) Date of Patent: Aug. 18, 2020

(54) COMPOSITE MATERIAL

(71) Applicant: SOLVAY SPECIALTY POLYMERS ITALY S.P.A., Bollate (IT)

(72) Inventors: Christine Hamon, Bollate (IT); Julio A. Abusleme, Saronno (IT); Riccardo Pieri, Milan (IT); Mathieu Fenoll, Everberg (BE)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 241 days.

(21) Appl. No.: 16/065,762

(22) PCT Filed: Dec. 16, 2016

(86) PCT No.: PCT/EP2016/081355
§ 371 (c)(1),
(2) Date: Jun. 22, 2018

(87) PCT Pub. No.: WO2017/108601
PCT Pub. Date: Jun. 29, 2017

(65) Prior Publication Data
US 2019/0006651 A1 Jan. 3, 2019

(30) Foreign Application Priority Data
Dec. 23, 2015 (EP) .................................. 15202476

(51) Int. Cl.
| | | |
|---|---|---|
| *H01M 2/14* | (2006.01) | |
| *H01M 2/16* | (2006.01) | |
| *H01M 10/056* | (2010.01) | |
| *H01M 10/052* | (2010.01) | |
| *H01G 11/52* | (2013.01) | |
| *H01G 11/84* | (2013.01) | |
| *H01G 11/62* | (2013.01) | |
| *C08F 214/22* | (2006.01) | |
| *C09D 127/16* | (2006.01) | |
| *H01G 11/56* | (2013.01) | |
| *H01G 9/02* | (2006.01) | |
| *H01G 9/022* | (2006.01) | |

(52) U.S. Cl.
CPC ......... *H01M 2/145* (2013.01); *C08F 214/225* (2013.01); *C09D 127/16* (2013.01); *H01G 9/02* (2013.01); *H01G 11/52* (2013.01); *H01G 11/56* (2013.01); *H01G 11/62* (2013.01); *H01G 11/84* (2013.01); *H01M 2/162* (2013.01); *H01M 2/166* (2013.01); *H01M 10/052* (2013.01); *H01M 10/056* (2013.01); *H01G 9/022* (2013.01); *H01M 2300/0085* (2013.01); *Y02E 60/13* (2013.01)

(58) Field of Classification Search
None
See application file for complete search history.

(56) References Cited

U.S. PATENT DOCUMENTS

| | | |
|---|---|---|
| 2002/0168569 A1 | 11/2002 | Barriere et al. |
| 2002/0197413 A1 | 12/2002 | Daido et al. |
| 2008/0138700 A1 | 6/2008 | Horpel et al. |
| 2009/0246625 A1 | 10/2009 | Lu |
| 2010/0099029 A1 | 4/2010 | Kinoshita et al. |
| 2010/0112449 A1 | 5/2010 | Fujita et al. |
| 2011/0014520 A1 | 1/2011 | Ueda |
| 2013/0023620 A1* | 1/2013 | Abusleme ............ B01D 69/148 524/546 |
| 2014/0315080 A1 | 10/2014 | Abusleme et al. |
| 2015/0024121 A1 | 1/2015 | He et al. |
| 2015/0024248 A1 | 1/2015 | He et al. |
| 2015/0030906 A1* | 1/2015 | Amin-Sanayei .... H01M 2/1686 429/144 |

FOREIGN PATENT DOCUMENTS

| | | |
|---|---|---|
| JP | 2009259755 A2 | 11/2009 |
| WO | 2011121078 A1 | 10/2011 |
| WO | 2013160240 A1 | 10/2013 |
| WO | 2014014758 A2 | 1/2014 |
| WO | 2015022229 A1 | 2/2015 |

OTHER PUBLICATIONS

Standard DIN EN ISO 3219, "Polymers/resins in the liquid state or as emulsions or dispersions—Determination of viscosity using a rotational viscometer with defined shear rate", 1994, p. 1-10.

* cited by examiner

Primary Examiner — Christopher P Domone

(57) ABSTRACT

The present invention relates to a process for the preparation of a composite material comprising a vinylidene difluoride (VDF)-containing copolymer and an electrically non-conductive polymeric material, to a composite material obtainable via said process, to its use in electrochemical cells and to an electrochemical cell comprising said composite.

20 Claims, No Drawings

COMPOSITE MATERIAL

CROSS-REFERENCE TO RELATED APPLICATIONS

This application is a U.S. national stage entry under 35 U.S.C. § 371 of International Application No. PCT/EP2016/081355 filed Dec. 16, 2016, which claims priority to European application No. 15202476.6, filed Dec. 23, 2015. The entire contents of these applications are explicitly incorporated herein by this reference.

TECHNICAL FIELD

The present invention relates to a process for the preparation of a composite material comprising a vinylidene difluoride (VDF)-containing copolymer and an electrically non-conductive porous polymeric material, to a composite material obtainable via said process, to its use in electrochemical cells and to an electrochemical cell comprising said composite.

BACKGROUND ART

Separators for use in electrochemical devices, in particular in secondary batteries, are needed to keep the anode physically and electrically separated from the cathode of the electrochemical cell, while permitting flow of electrolyte ions.

Separators must be chemically and electrochemically stable towards the electrolyte and the electrode materials and must be mechanically strong enough to withstand high tensions generated during battery assembly operations.

Further, their structure and properties may considerably affect battery performances, including energy density, power density, cycle life as well as safety.

For high energy and power densities, the separator is required to be very thin and highly ionically conductive, while still remaining mechanically strong.

During battery operation, thermal runaway may occur, which may cause dimensional shrinking or melting of the separator, eventually leading to physical contact of the electrodes and to internal short circuit and fire hazard.

For battery safety, the separator must be able to shut the battery down when overheating occurs, so as to avoid the thermal runaway.

Inorganic composite membranes have been widely used as separators for electrochemical devices including secondary batteries, in particular Lithium-ion batteries. Examples of composite porous films for use in membranes are disclosed in. US 2002/197413 A (TEIJIN LTD) 13 Sep. 2001

WO 2015/022229 (SOLVAY S.A.) discloses a process for manufacturing a solid composite separator comprising coating a porous substrate with a composition including a copolymer of VDF/HFP/HEA and silica, followed by a drying step and then, optionally by a curing and by a compression step.

US 2014/315080 (ABUSLEME) discloses a hybrid VDF-HFP-HEA/silica polymer obtained by reaction of TEOS (tetraethylorthosilicate) with a composition including a copolymer VDF-HFP-HEA.

Also, a low thickness of the separator is required for high energy and power densities. However, this adversely affects the mechanical strength of the separator and the safety of the battery thereby provided.

A variety of inorganic filler materials have been long used to fabricate inorganic composite membranes wherein inorganic particles are distributed throughout a polymeric binder matrix.

Although inorganic composite membranes offer excellent wettability by the electrolytes, good thermal stability and zero-dimensional shrinkage at high temperatures, they are usually not mechanically strong enough to withstand handling in cell winding and assembly.

In particular, separators used in wound electrochemical cells require a high mix penetration strength to avoid penetration of electrode materials through the separator. If particulate materials from the electrodes penetrate the separator, a short circuit will result.

In many cases, the inorganic composite membrane contains a very high content of inorganic filler materials. In some instances, the so-obtained inorganic composite membrane exhibits poor mechanical strength and tends to break down during handling, hence they ultimately result very difficult to use in the manufacture of assemblies for electrochemical cells.

One particular challenge has been thus to provide for composite membranes with acceptable thickness to be suitably used as separators in electrochemical devices.

Multilayer composite membranes can be obtained using multiple coating steps. However, multiple steps disadvantageously increase processing costs.

There is thus still the need in the art for an solid composite separator having high ionic conductivity, to be suitably used in electrochemical devices, that exhibits also outstanding thermal and mechanical properties necessary during assembly and/or operation of the same devices, and for the process for its preparation.

SUMMARY OF INVENTION

The present invention provides a process for the preparation of a composite material comprising:
a) providing a porous substrate (P) consisting of an electrically non-conductive polymeric material;
b) mixing, optionally in the presence of a liquid medium (L1), an electrolyte salt (ES-1), an ionic liquid (IL-1) and a compound (M) of formula (I)

$$X_{4-m}AY_m \qquad (I)$$

wherein X is a hydrocarbon group, optionally comprising one or more functional groups, m is an integer from 1 to 4, A is an element selected from the group consisting of Si, Ti and Zr, and Y is a hydrolysable group selected from the group consisting of an alkoxy group, an acyloxy group and a hydroxyl group, to form an electrolyte composition (EC-1); c) mixing (EC-1) with a composition (C1) comprising at least one fluoro co-polymer (F), that comprises recurring units deriving from vinylidene difluoride (VDF) and recurring units deriving from at least monomer (R1) having at least one functional group —O—Rx and/or —C(O)O—Rx, wherein each Rx, optionally independently from the others, is a hydrogen group or a $C_1$-$C_5$ hydrocarbon group comprising at least one hydroxyl group, to obtain a composition (C);
d) impregnating the support (P) with the composition (C) obtained in step c);
e) removing the liquid medium (L1), if present, to obtain a composite material, wherein the inorganic residues deriving from compound (M) are bound with the functional groups deriving from —O—Rx and/or —C(O)O—Rx of copolymer (F);

wherein the viscosity of composition (C) used in the impregnation step d) from 50 to 500 mPa·s.

The present invention further provides a composite material obtained via the process above described and its use as a separator in an electrochemical cell.

In an aspect, the present invention provides an electrochemical cell, preferably a lithium battery, comprising the composite obtainable via the process as above defined, and the method for its manufacturing.

DESCRIPTION OF EMBODIMENTS

It was surprisingly found that the process of the invention as above described provides a composite material that is advantageously endowed with enhanced thermo-mechanical properties and suitable conductivity to be used as separator in electrochemical cells.

The inventors have found that by using the specific process as defined above, a polymeric porous substrate, preferably a non-woven material, can be efficiently impregnated to obtain a composite that comprises a fluoropolymer hybrid organic-inorganic network and, advantageously, at the same time allows ionic conduction and shows high mechanical resistance e.g. in terms of piercing strength (puncture strength) and tensile strength.

Unless otherwise specified, in the context of the present invention the amount of a component in a composition is indicated as the ratio between the weight of the component and the total weight of the composition multiplied by 100 (also: "wt %").

By the term "separator", it is hereby intended to denote a monolayer or multilayer polymeric or inorganic material, which electrically and physically separates electrodes of opposite polarities in an electrochemical cell and is permeable to ions flowing between them.

Advantageously, electrochemical cells comprising the composite according to the invention as a separator can be easily assembled and show prolonged service life, by virtue of its high mechanical properties and of its excellent ionic conductivity.

By the term "composite" or "composite material" it is hereby intended to denote a material formed of two or more substances, optionally in a multilayer arrangement, that is in the solid state at 20° C. under atmospheric pressure.

It is understood that the solid composite separator obtainable by the process of the invention is a unitary assembly wherein at least one surface the substrate (P) is impregnated with the composition (C).

Advantageously, the composite according to the present invention can be a solid-gel composite, i.e. a unitary material comprising a solid and a gel phase compenetrated to each other, wherein the electrolyte solution or suspension in the ionic liquid form the gel portion.

By the term "porous substrate layer", it is hereby intended to denote a substrate layer containing pores of finite dimensions, that is electrically and chemically inert.

The substrate (P) has typically a porosity advantageously of at least 5%, preferably of at least 10%, more preferably of at least 20% or at least 40% and advantageously of at most 90%, preferably of at most 80%, e.g. measured via Gurley number as described in method ISO 5636-5.

Determination of the thickness can be performed by any suitable method. The thickness is preferably determined according to ISO 4593 standard procedure.

The thickness of substrate (P) is not particularly limited and is typically from 3 to 100 micrometers, preferably from 5 to 50 micrometers.

By "non-woven material" or "non-woven fabric" it is intended to denote a planar textile structure obtainable by randomly interlocking or bonding mechanically, thermally or chemically one or more sets of polymer materials, preferably comprising or consisting of polymeric fibres, leading to a structure with numerous pores. In the composite obtainable according to the process of the invention, the polymer fibres are non-electrically conductive when uncoated.

The substrate (P) can be made by any porous substrate or fabric commonly used for a separator in electrochemical device, comprising at least one material selected from the group consisting of polyethyleneterephthalate, polybutyleneterephthalate, polyphenylene sulphide, polyester, polyacetal, polyamide, polycarbonate, polyimide, polyetherether ketone, polyether sulfone, polyphenylene oxide, polyphenylene sulfide, polyethylene naphthalene, polyethylene oxide, polyacrylonitrile, polyethylene and polypropylene, or their mixtures.

Preferably, the material of the porous substrate (P) is selected from the group consisting of polyesters such as polyethylene terephthalate, polyacrylonitrile, polyphenylene sulphides, polyamides, polyimides, polyacrylates, polytetrafluoroethylene and polyolefins such as polyethylene or polypropylene, more preferably polyethylene terephthalate or polyphenylene sulphide. Preferably, the porous substrate (P) is a non-woven fabric, which more preferably consists of fibres of any of said materials, or mixtures thereof. It was found that effective impregnation of non-woven materials is not feasible using compositions (C) as described above having viscosity lower than 50 and higher than 500 mPa·s.

Preferably, the viscosity of composition (C) in the impregnation step d) of the process according to the invention is from 75 to 300 mPa·s, more preferably from 100 to 250, even more preferably from 150 to 200 mPa·s.

The ratio between the weight of the coating and the weight of the support layer in the at least partially coated separator obtainable according to the invention is typically, but not limited to, 4:1 to 1:4, preferably 3:1 to 1:1.

By the term "electrochemical cell", it is hereby intended to denote an electrochemical assembly comprising a positive electrode, a negative electrode and a liquid, solid or gel-state electrolyte, wherein a monolayer or multilayer separator is permanently adhered to at least one surface of one of said electrodes.

Non-limitative examples of suitable electrochemical devices include, notably, secondary batteries, especially, alkaline or an alkaline-earth secondary batteries such as lithium ion batteries, and capacitors, especially lithium ion-based capacitors and electric double layer capacitors ("supercapacitors").

For the purpose of the present invention, by vinylidene difluoride (VDF) polymer it is intended to denote a polymer that comprises recurring units derived from vinylidene difluoride (also generally indicated as vinylidene fluoride 1,1-difluoroethylene, VDF), i.e. a polymer derived from the polymerization of recurring units including vinylidene difluoride (VDF), which are present in the final polymer in an amount that is not less than 40% in weight over the total weight of the polymer. The terms "fluoro co-polymer" or "co-polymer" indicate generally a copolymer of VDF, i.e. polymers wherein the units derived from VDF are present and form less than 100% of the total recurring units.

Preferably, co-polymer (F) contains not less than 50 wt %, more preferably not less than 65 wt %, or 70 wt % or 85% of recurring units deriving from VDF.

Preferably, the content of recurring units derived from monomer (R1) as defined above in copolymer (F) in the process of the present invention is 15 to 50 wt %, more preferably from 25 to 40 wt %, even more preferably from 30 to 35 wt %.

The copolymer (F) typically comprise recurring units (R1) derived from at least one (meth)acrylic monomer (MA) having formula (II) here below:

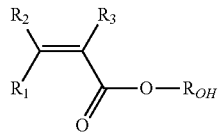
(II)

wherein:

$R_1$, $R_2$ and $R_3$, equal to or different from each other, are independently selected from a hydrogen atom and a $C_1$-$C_3$ hydrocarbon group, and $R_{OH}$ is a hydrogen atom or a $C_1$-$C_5$ hydrocarbon moiety comprising at least one hydroxyl group.

Co-polymer (F) typically comprises at least 0.01 wt %, preferably at least 0.02 wt %, more preferably at least 0.03 wt % of recurring units (R1) derived from at least one (meth)acrylic monomer (MA) having formula (II) as described above.

Co-polymer (F) typically comprises at most 10 wt %, preferably at most 5 wt %, more preferably at most 2 wt % of recurring units (R1) derived from at least one (meth) acrylic monomer (MA) having formula (II) as described above.

The (meth)acrylic monomer (MA) preferably complies with formula (III) here below:

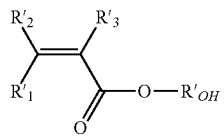
(III)

wherein:

$R'_1$, $R'_2$ and $R'_3$ are hydrogen atoms, and $R'_{OH}$ is a hydrogen atom or a $C_1$-$C_5$ hydrocarbon moiety comprising at least one hydroxyl group.

Non-limitative examples of (meth)acrylic monomers (MA) include, notably, acrylic acid, methacrylic acid, hydroxyethyl(meth)acrylate, hydroxypropyl(meth)acrylate, hydroxyethylhexyl(meth)acrylate.

The (meth)acrylic monomer (MA) is more preferably selected from the followings:

hydroxyethyl acrylate (HEA) of formula:

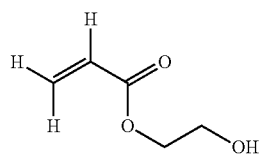

2-hydroxypropyl acrylate (HPA) of either of formulae:

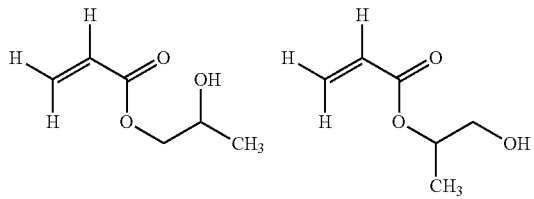

and mixtures thereof.

The (meth)acrylic monomer (MA) is even more preferably hydroxyethyl acrylate (HEA).

The co-polymer (F) preferably comprises at least 0.05 by moles, more preferably at least 0.1% by moles (i.e. in number of moles over the total number of moles of the recurring units in (F)), even more preferably at least 0.2% by moles of recurring units derived from said monomer (MA) having formula (I) as defined above.

The co-polymer (F) preferably comprises at most 10% by moles, more preferably at most 7.5% by moles, even more preferably at most 5% or at most 3% by moles by moles of recurring units derived from said monomer (MA) having formula (I) as defined above.

The inventors have found that best results are obtained when co-polymer (F) is a linear semi-crystalline copolymer.

The term semi-crystalline is intended to denote a polymer which possesses a detectable melting point. It is generally understood that a semi-crystalline polymer possesses a heat of fusion determined according to ASTM D 3418 of advantageously at least 0.4 J/g, preferably of at least 0.5 J/g, more preferably of at least 1 J/g.

The inventors have found that a substantially random distribution of hydrophilic (meth)acrylic monomer (MA) within the polyvinylidene fluoride backbone of the co-polymer (F) advantageously maximizes the effects of the modifying monomer (MA) on both adhesiveness and/or hydrophilic behaviour of the resulting copolymer, even at low levels of hydrophilic (meth)acrylic monomer (MA) in the composition, without impairing the other outstanding properties of the vinylidene fluoride polymers, e.g. thermal stability and mechanical properties.

Co-polymer (F) can advantageously be a linear copolymer, that is to say that it can be composed of macromolecules made of substantially linear sequences of recurring units from VDF monomer and (MA) monomer; co-polymer (F) is thus distinguishable from grafted and/or comb-like polymers.

Co-polymer (F) advantageously possesses improved thermal resistance. In particular, polymer (F) undergoes a loss in weight of 1% wt in TGA analysis under nitrogen following ISO 11358 standard at a temperature of more than 350° C., preferably of more than 360° C., more preferably of more than 380° C.

Co-polymer (F) may comprise recurring units deriving from at least another monomer (R2), in addition to those derived from the monomer (R1) as above defined.

Such monomer (R2) can include at least one conventionally used monomer copolymerizable with vinylidene fluoride, such as, but not limited to, vinyl fluoride, trifluoroethylene, trifluorochloroethylene, tetrafluoroethylene, hexafluoropropylene, and fluoroalkyl vinyl ether and their mixtures. In any case, it is preferred that the amount of vinylidene fluoride in copolymer (F) is at least 70 mol %, so as not to impair the excellent properties of vinylidene fluoride resin, such as chemical resistance, weatherability, and heat resistance. The amount of comonomer (R2) is preferably below 10 mol %, more preferably below 5 mol % or below 2 mol % over the total number of moles of recurring units in co-polymer (F). More preferably, co-polymer (F) does not include any monomer other than vinylidene fluoride (VDF) and monomer (R1) as defined above.

The composition (C) can optionally comprise at least one other component, in addition to copolymer (F), and to an electrolyte salt (ES-1), compound (M) of formula (I) as defined above and ionic liquid (IL-1). Preferably, said at least one optional component are selected from an antifoam agent, a surfactant, an anti-bacterial agent, a filler and mixtures thereof. Typically, such optional components, when present, are in an amount lower than 15 wt % over the weight of the composition (C), preferably below 10, 7, 5 or 3 wt %.

A solvent system is typically used to disperse the polymer binder in the compositions used for coating of an inert support, which generally comprises N-methyl pyrrolidone (NMP) or mixtures of N-methyl pyrrolidone and a diluting solvent such as acetone, propyl acetate, methyl ethyl ketone and ethyl acetate.

For instance, US 2002/0168569 (ATOFINA) 14 Nov. 2002 discloses a process for manufacturing separators for Lithium-ion batteries, said process comprising processing a microcomposite powder comprising from 20% to 80% by weight of a fluoropolymer and from 80% to 20% by weight of fillers. This microcomposite powder may be processed in order to result in separators suitable for use in Lithium-ion batteries notably by dispersion in water or in a solvent such as acetone or N-methyl-2-pyrrolidone to obtain a paste which is then applied to a support by doctor blading and dried.

In the process according to the present invention the liquid medium (L1) and the composition (C1) comprise at least an aprotic organic solvent such as, but not limited to, DMF (N,N-dimethylformamide), DMSO (dimethyl sulfoxide), DMA (N,N-dimethylacetamide), NMP (N-methylpyrrolidone), cyclohexanone, acetone, methyl ethyl ketone, tetrahydrofuran, dioxane, ethyl acetate, propylene carbonate, cyclohexane, methyl isobutyl ketone, dimethyl phthalate, and solvent mixtures of these. Preferably, liquid medium (L1) and the composition (C1) comprise at least an aprotic organic solvent selected from DMF, DMSO, DMA, NMP, cyclohexanone, acetone and mixtures thereof. However, more preferably, in the process of the present invention no solvent is present which is flammable or may pose an environmental hazard linked to its use or disposal. The choice of such solvent(s) is not particularly limited, as long as they do not dissolve or damage the integrity of the polymeric inert support (P).

Small amounts of the liquid medium may be present in the composite material obtained according to the invention after the drying step e). The upper limit for the content of liquid medium in the composite is not particularly limited, being nevertheless understood that, after the drying and, optionally, curing the amount of liquid medium, such as organic solvent(s) if any, which is stably incorporated and retained in the composite will be of at most 10% by weight, preferably of at most 5% by weight, more preferably of at most 1% by weight, even more preferably of at most 0.2% by weight based on the weight of composite.

Optionally, after step e) a curing step can be carried out to improve mechanical properties and heat stability of the so-obtained composite material. Preferably, said curing step comprises heating of the composite to a temperature that does not affect the structure of the inert support, e.g. at temperatures from 100° C. to 250° C., preferably from 120° C. to 200° C., for 30 minutes to 2 hours.

Preferably, in composition (C1) the fluoro co-polymer (F) is in the form of a powder or a powder dispersed or suspended in an aqueous medium, wherein co-polymer (F) is homogeneously dispersed in the form of primary particles having an average primary particle size of more than 1 µm, as measured according to ISO 13321. Even more preferably, said aqueous dispersion can directly derive from aqueous polymerization and is can be an aqueous slurry that can prepared by dispersing co-polymer (F) powders in an aqueous medium, wherein the average particle size of co-polymer (F) powders dispersed in the aqueous slurry is typically higher than 1 µm, as measured according to ISO 13321.

Without wishing to be bound by theory, it is believed that the advantageous properties of the composite material obtained according to the process of the present invention derive at least partially from the formation of an inorganic/organic network between residuals deriving form compound (M) and hydrophilic moieties present in the structure of co-polymer (F), particularly deriving from recurring units (R1). Structures of this kind are obtained e.g. in WO 2011/121078 A (SOLVAY SPECIALTY POLYMERS ITALY) 6 Oct. 2011 and in WO 2013/160240 A (SOLVAY SA AND CNRS) 31 Oct. 2013.

Preferably, in compound (M), X is a $C_1$-$C_5$ hydrocarbon group, i.e. a linear or branched alkyl or alkylene group.

Preferably, in the process according to the present invention the compound (M) is an alkoxysilane, more preferably tetramethoxysilane (TMOS) or tetraethoxysilane (TEOS).

Preferably, in the process according to the present invention, (EC-1) and/or (C1) comprise a solid inorganic filler selected form an inorganic oxide, preferably $SiO_2$, $TiO_2$, ZnO, $Al_2O_3$ and mixed oxides, an alkaline or alkaline earth metal sulphate, carbonate, sulphide or mixtures thereof.

Preferably, in the process according to the invention, the electrolyte salt (ES-1) is a lithium salt (preferably lithium bistrifluoromethanesulfonimide and/or lithium bis(fluorosulfonyl)imide.

Preferably, in the process according to the invention, the ionic liquid (IL) is selected from those comprising as cation a sulfonium ion or an imidazolium, pyridinium, pyrrolidinium or piperidinium ring, said ring being optionally substituted on the nitrogen atom and comprising as anion those chosen from halides anions, perfluorinated anions and borates, in particular N-Propyl-N-methylpyrrolidinium bis(trifluoromethanesulfonyl) imide (Pyr13TFSI).

Preferably, the process according to the present invention is carried out a temperature in the range of 20-70° C., preferably from 25 to 60° C., more preferably from 30 to 50° C. or to 40° C.

In an embodiment, the present invention pertains to the composite material obtainable via the process as above defined, preferably wherein the porous substrate (P) is a non-woven fabric.

In an aspect, the present invention provides a composite material comprising a porous substrate (P), consisting of electrically non-conductive polymeric material, that is impregnated with an hybrid inorganic/organic composition comprising: an electrolyte salt (ES-1), an ionic liquid (IL-1) and a compound (M) of formula (I)

$$X_{4-m}AY_m \qquad (I)$$

wherein X is a hydrocarbon group, optionally comprising one or more functional groups, m is an integer from 1 to 4, A is an element selected from the group consisting of Si, Ti and Zr, and Y is a hydrolysable group selected from the group consisting of an alkoxy group, an acyloxy group and a hydroxyl group and at least one fluoro co-polymer (F), that comprises recurring units deriving from vinylidene difluoride (VDF) and recurring units deriving from at least a monomer (R1) having at least one functional group —O—Rx and/or —O(O)O—Rx, wherein each Rx, optionally independently from the others, is a hydrogen group or a $C_1$-$C_5$ hydrocarbon group comprising at least one hydroxyl group wherein the inorganic residues deriving from compound (M) are bound with the functional groups deriving from —O—Rx and/or —O(O)O—Rx of copolymer (F).

Preferably, in the composite material according to the invention X is a $C_1$-$C_5$ hydrocarbon group, i.e. a linear or branched alkyl or alkylene group.

Preferably, in the composite material according to the present invention the porous substrate (P) is a non-woven fabric as defined above.

Preferably, the composite material according to the invention contains 20-40 wt % over the total weight of the composite material of an fluoropolymer hybrid organic/inorganic network formed by the cross-linking the inorganic residues deriving from compound (M) and the functional groups deriving from —O—Rx and/or —O(O)O—Rx of copolymer (F).

Preferably, in the composite according to the present invention the compound (M) is an alkoxysilane, more preferably tetramethoxysilane (TMOS) or tetraethoxysilane (TEOS).

In another aspect, the present invention provides a method for manufacturing of an electrochemical cell, which comprises using the composite material as defined above as the separator in the electrochemical cell, preferably in a lithium battery or a capacitor.

In yet another aspect, the present invention relates to the use of the composite material, as defined above, as a separator in an electrochemical cell, preferably wherein the electrochemical cell is a lithium battery or a capacitor.

In another aspect, the present invention pertains to a lithium battery comprising the composite as above defined, preferably wherein the separator of the battery comprises, or consists of, said composite.

Should the disclosure of any patents, patent applications, and publications which are incorporated herein by reference conflict with the description of the present application to the extent that it may render a term unclear, the present description shall take precedence.

Experimental Part

Measurement of the Ionic Conductivity ($\sigma$)

The solid electrolyte separator is placed in a ½ inch stainless steel Swagelok-cell prototype. The resistance of the solid polymer electrolyte separator was measured and the ionic conductivity ($\sigma$) was obtained using the following equation:

$$\sigma = d/(R \times S)$$

wherein d is the thickness of the film, $R_b$ the bulk resistance and S is the area of the stainless steel electrode.

Measurement of Tensile Properties of the Composite Material Obtained According to the Invention The tensile properties were measured by tensile testing at 23° C. according to ASTM D638 standard test method (specimen of type V, grip distance=25.4 mm, Lo=21.5 mm, 1-50 mm/min).

Measurement of the Viscosity of the Compositions

The viscosity was measured in accordance with ISO/DIN 3219, using a rheometer MCR301 from Anton Paar. The measurements were performed with cone-plate geometry (CP50-1). The cone had a diameter of 50 mm and angle of 1 degree. The viscosity values are reported at shear rate of 200 s-1.

Plate Temperature: 20° C.

Measuring point duration (time between two measurements)

Log profile: —Initial: 2 sec; —final: 10 sec

Duration: —measuring points #: 25—interval duration: 125.3 sec (1 way)

Shear: —mode: Ramp Log; —initial: 0.01 1/s→200 1/s→0.01 1/s

General Procedure of Manufacturing of the Composite Material with a VDF/HEA Copolymer and a Non-Woven Substrate.

The dissolution of a VDF/HEA copolymer (content of HEA=0.8 mol %, corresponding to 1.3 wt % over the total weight of the polymer) (polymer (F1), 1 g) was carried out in a mixture of an aliphatic ketone and DMSO during 4 h at 60° C.

An electrolyte solution was formed by the mixture of the electrolytic salt (ES-1) and the ionic liquid (IL-1) with the following relative amount: 0.5 M of LiTFSI (ES-1) in the Pyr13TFSI (IL-1). The electrolyte solution so obtained had an ionic conductivity of $2.4 \times 10^{-3}$ S/cm at 25° C.

The electrolyte solution (1 g) and tetraethoxysilane (TEOS) (0.29 g) (compound (M)) were added to the VDF/HEA copolymer solution (6.39 g) and stirred during 10 minutes at room temperature. A mixture was obtained containing 19% by volume (23% by weight) of VDF/HEA copolymer, 75% by volume (71% by weight) of the electrolyte solution and 6% by volume (6% by weight) of silica (equivalent amount of TEOS fully condensated). 0.13 g of formic acid was then added to the mixture and the mixture was stirred for 30 sec at room temperature.

After 5 minutes from the preparation, the mixture was casted at room temperature on the non-woven substrate and dried at 50° C. for 30 min.

The mixture was prepared a second time and then casted within 5 minutes from the preparation on the uncoated side of the non-woven substrate, which was then dried at 50° C. for 30 min. The so-obtained composite was cured by heating at 150° C. for 45 minutes.

Rheological Data of the Composition (C)

It was observed that the viscosity of composition (C) according to the invention increases rapidly over time, varying from 50 mPa·s at 5 min after the preparation to 112 mPa·s after 30 min, whereas the viscosity of the composition used in comparative example 2, which exhibits poor impregnation capacity, is basically constant over time (35 mPa·s 5 min after preparation, 27 mPa·s after 60 min).

The following were prepared:

Example 1 composite obtained by casting composition (C) as prepared above according to the invention (viscosity=50 mPa·s during the casting step, after 5 minutes from the preparation)+non-woven PET as support (P).

Comparative Example 1 film obtained by casting the composition (C) according to the invention without support material (P).

Comparative Example 2 composition prepared according to the procedure above except that TEOS (compound (M)) was not added, i.e. comprising only (F1), (IL-1), (ES-1) and a fluoro copolymer (F1) (viscosity=35 mPa·s)+PET non-woven as support (P).

Comparative Example 3

PET non-woven support (P) coated with a mixture of IL-1 and of ES-1 as defined above (in the absence of copolymer (F) and of compound (M)).

Ionic Conductivity

TABLE 1

| | Ionic Conductivity (S/cm) at 25° C. |
|---|---|
| Example 1 | $1.3 \times 10^{-3}$ |
| Comp. Ex. 1 | $1.2 \times 10^{-3}$ |
| Comp. Ex. 2 | $3.2 \times 10^{-4}$ |
| Comp. Ex. 3 | $3.0 \times 10^{-4}$ |

Mechanical Properties

TABLE 2

| | Modulus (MPa) | Yield Stress (MPa) | Yield strain (%) | Stress at break (MPa) | Strain at break (%) |
|---|---|---|---|---|---|
| Example 1 | 568 | 13.5 | 3.8 | 20.9 | 13 |
| Comp. Ex. 1 | 7.4 | 0.9 | 10.6 | 1.4 | 34.4 |
| Comp. Ex. 2 | 369 | 9.4 | 3.8 | 17.1 | 18 |
| Comp. Ex. 3 | 1373 | 28.6 | 3.1 | 42.7 | 13.3 |

Application in a Rechargeable Lithium Battery:
LFP (positive electrode): 82% LiFePO$_4$/10% super C65/ 8% SOLEF®
5130 PVDF as binder, loading=0.6 mAh/cm$^2$
Super C65=carbon powder
Manufacture of the Battery The membrane was dried at 55° C. under vacuum during one night before being used in the battery.

The positive electrode was dried during one night under vacuum at 130° C. The electrodes and the membrane were put in argon environment (no oxygen or humidity). Two drops of ES was added to the positive electrode The membrane was then placed between the positive electrode and the lithium metal in a coin cell and it was tested at 55° C.

The average discharge capacity values (mAh/g) of the coin cells so obtained at different discharge rates are set forth in Table 3 here below. The C rate is the current needed to discharge the nominal capacity of the cell in 1 hour.

TABLE 3

| | | Average Discharge (mAh/g) | | | |
|---|---|---|---|---|---|
| C-Rate | | Ex 1 | Comp Ex 1 | Comp Ex 2 | Comp Ex 3 |
| 0.05 | Discharge D/20 | 150 | 151 | 146 | Short circuit |
| 0.1 | Discharge D/10 | 148 | 150 | 141 | |
| 0.2 | Discharge D/5 | 143 | 145 | 127 | |
| 0.5 | Discharge D/2 | 135 | 142 | 35 | |
| 1 | Discharge D | 94 | 126 | 15 | |

It was found that polymer substrates as described above are not effectively impregnated by compositions having a viscosity lower than 50 or higher that 500 mPa·s, in that the separators obtained by using such comparative compositions exhibit too low ionic conductivity and/or low tensile and puncture strengths.

The invention claimed is:

1. A process for the preparation of a composite material comprising the steps of:
   a) providing a porous substrate (P) consisting of an electrically non-conductive polymeric material;
   b) mixing, optionally in the presence of a liquid medium (L1), an electrolyte salt (ES-1), an ionic liquid (IL-1) and a compound (M) of formula (I)

$$X_{4-m}AY_m \qquad (I)$$

wherein X is a hydrocarbon group, optionally comprising one or more functional groups, m is an integer from 1 to 4, A is an element selected from the group consisting of Si, Ti and Zr, and Y is a hydrolysable group selected from the group consisting of an alkoxy group, an acyloxy group and a hydroxyl group, to form an electrolyte composition (EC-1);
   c) mixing electrolyte composition (EC-1) with a composition (C1), said composition (C1) comprising at least one fluoro co-polymer (F), that comprises recurring units derived from vinylidene difluoride (VDF) and recurring units derived from at least monomer (R1) having at least one functional group —O-Rx and/or —C(O)O—Rx, wherein each Rx, optionally independently from the others, is a hydrogen group or a $C_1$-$C_5$ hydrocarbon group comprising at least one hydroxyl group, to obtain a composition (C);
   d) impregnating the substrate (P) with the composition (C) obtained in step c);
   e) removing the liquid medium (L1), if present, to obtain a composite material, wherein inorganic residues derived from compound (M) are bound with the functional groups deriving from —O—Rx and/or —C(O) O—Rx of copolymer (F); wherein the viscosity of composition (C) used in the impregnation step d) is from 50 to 500 mPa·s when measured at a shear rate of 200 sec$^{-1}$, and at a temperature of 20° C., according to ISO/DIN 3219.

2. The process according to claim 1, wherein composition (C1), and optionally liquid medium (L1), comprise at least an aprotic organic solvent.

3. The process according to claim 1, wherein compound (M) is an alkoxysilane.

4. The process according to claim 1, wherein the porous substrate (P) is a non-woven fabric of polymeric fibres.

5. The process according to claim 1, wherein electrolyte composition (EC-1) and/or composition (C1) comprise a solid inorganic filler selected from an inorganic oxide; an alkaline or alkaline earth metal sulphate, carbonate or sulphide; and mixtures thereof.

6. The process according to claim 1, wherein monomer (R1) is a (meth)acrylic monomer of formula (II):

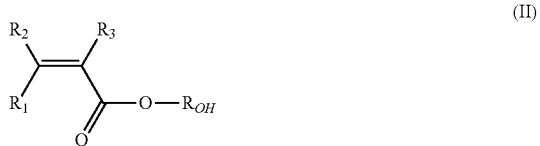

wherein each of $R_1$, $R_2$ and $R_3$, equal to or different from each other, is independently a hydrogen atom or a $C_1$-$C_3$ hydrocarbon group, and $R_X$ is a hydrogen atom or a $C_1$-$C_5$ hydrocarbon moiety comprising at least one hydroxyl group.

7. The process according to claim 1, wherein fluoro co-polymer (F) further comprises at least a monomer (R2) different from (R1).

8. The process according to claim 7, wherein the at least one monomer (R2) in the co-polymer (F) is selected from vinyl fluoride, trifluoroethylene, trifluorochloroethylene, tetrafluoroethylene, hexafluoropropylene, fluoroalkyl vinyl ether and their mixtures.

9. The process according to claim 1, wherein porous substrate (P) is selected from the group consisting of polyesters, polyacrylonitrile, polyamides, polyimides, polyacrylates, polytetrafluoroethylene and polyolefins.

10. The process according to claim 1, wherein the electrolyte salt (ES-1) is a lithium salt.

11. The process according to claim 1, wherein ionic liquid (IL) is selected from the group consisting of compounds comprising a cation selected from a sulfonium ion and an imidazolium, pyridinium, pyrrolidinium or piperidinium ring, said ring being optionally substituted on the nitrogen atom, and compounds comprising an anion selected from halide anions, perfluorinated anions and borates.

12. A composite material comprising a porous substrate (P), consisting of an electrically non-conductive polymeric material that is impregnated with a hybrid inorganic/organic composition, said hybrid inorganic/organic composition comprising: an electrolyte salt (ES-1), an ionic liquid (IL-1) and a compound (M) of formula (I)

$$X_{4-m}AY_m \quad (I)$$

wherein X is a hydrocarbon group, optionally comprising one or more functional groups, m is an integer from 1 to 4, A is an element selected from the group consisting of Si, Ti and Zr, and Y is a hydrolysable group selected from the group consisting of an alkoxy group, an acyloxy group and a hydroxyl group and at least one fluoro co-polymer (F), that comprises recurring units derived from vinylidene difluoride (VDF) and recurring units derived from at least a monomer (R1) having at least one functional group —O—Rx and/or —C(O)O—Rx, wherein each Rx, optionally independently from the others, is a hydrogen group or a $C_1$-$C_5$ hydrocarbon group comprising at least one hydroxyl group wherein the inorganic residues derived from compound (M) are bound with the functional groups derived from —O—Rx and/or —C(O)O—Rx of copolymer (F).

13. A method for manufacturing of an electrochemical cell, which comprises using the composite material according to claim 12 as the separator in the electrochemical cell.

14. The method according to claim 13, wherein the electrochemical cell is a lithium battery or a capacitor.

15. A lithium battery comprising the composite obtained obtainable via the process in claim 1.

16. The process according to claim 2, wherein the aprotic organic solvent is at least one solvent selected from the group consisting of DMF, DMSO, DMA, NMP, cyclohexanone, acetone and mixtures thereof.

17. The process according to claim 3, wherein the alkoxysilane is tetramethoxysilane (TMOS) or tetraethoxysilane (TEOS).

18. The process according to claim 5, wherein the inorganic oxide is selected from $SiO_2$, $TiO_2$, ZnO, $Al_2O_3$ and mixed oxides.

19. The process according to claim 9, wherein porous substrate (P) is selected from the group consisting of polyethylene terephthalate and polyphenylene sulphide.

20. The process according to claim 11, wherein ionic liquid (IL) is N-propyl-N-methylpyrrolidinium bis(trifluoromethanesulfonyl)imide.

* * * * *